United States Patent [19]
Shimanaka

[11] Patent Number: 5,142,945
[45] Date of Patent: Sep. 1, 1992

[54] POWER TRAIN CONTROL SENSOR MALFUNCTION DETECTION AND CONTROL ARRANGEMENT

[75] Inventor: Shigeki Shimanaka, Hadashino, Japan

[73] Assignee: Nissan Motor Co., Ltd., Yokohama, Japan

[21] Appl. No.: 387,274

[22] Filed: Jul. 31, 1989

[30] Foreign Application Priority Data

Aug. 1, 1988 [JP] Japan ............................ 63-190533

[51] Int. Cl.$^5$ ............................................ B60K 41/06
[52] U.S. Cl. .................................................. 74/866
[58] Field of Search .............. 74/866, 851, 872, 858; 364/424.1

[56] References Cited

U.S. PATENT DOCUMENTS

| | | | |
|---|---|---|---|
| 4,266,447 | 5/1981 | Heess et al. | 74/858 |
| 4,355,550 | 10/1982 | Will et al. | 64/866 X |
| 4,393,732 | 7/1983 | Suzuki et al. | 74/866 |
| 4,403,527 | 9/1983 | Mohl et al. | 74/866 X |
| 4,635,508 | 1/1987 | Tatsumi | 74/866 |
| 4,680,988 | 7/1987 | Mori | 364/424.1 X |
| 4,685,051 | 8/1987 | Hattori et al. | 74/866 X |
| 4,691,285 | 9/1987 | Takeda | 74/866 X |
| 4,744,031 | 5/1988 | Takeda et al. | 364/424.1 |
| 4,896,569 | 1/1990 | Ito et al. | 74/866 |
| 4,967,620 | 11/1990 | Shimanaka | 74/866 |
| 4,969,099 | 11/1990 | Iwatsuki et al. | 74/866 X |
| 5,063,814 | 11/1991 | Baba et al. | 74/866 |
| 5,086,669 | 2/1992 | Fujiwara et al. | 74/866 |

FOREIGN PATENT DOCUMENTS 58-77138 5/1983 Japan .

OTHER PUBLICATIONS

Nissan Full-Range Automatic Transmission RE4R01A Type, Service Manual, (A261C07) issued on Mar. 1987 by Nissan Motor Company Limited.

*Primary Examiner*—Richard Lorence
*Assistant Examiner*—Khoi Q. Ta
*Attorney, Agent, or Firm*—Foley & Lardner

[57] ABSTRACT

In the event of a sensor malfunction, a fail safe arrangement either modifies or inhibits controls which are intended to reduce shift shock and/or friction element slippage and which adjust either the level of line pressure or vary the torque generated by the prime mover during shifts.

4 Claims, 8 Drawing Sheets

POWER TRAIN CONTROL SENSOR MALFUNCTION DETECTION AND CONTROL ARRANGEMENT

BACKGROUND OF THE INVENTION

1. Field of the Invention

The present invention is related to a power train which includes a prime mover in the form of an engine and a transmission which is operatively connected therewith and more specifically to a shift shock attenuation arrangement therefor which includes a sensor malfunction diagnostic function.

2. Description of the Prior Art

JP-A-58-77138 discloses an arrangement which has sought to reduce shift shock by selectively varying the torque output of the prime mover during periods when the transmission is undergoing a shift.

However, this arrangement has proven only partially effective in that the shocks and/or friction element slippage which are produced during shifting are also related to the level of line pressure and in the event of a sensor malfunction the shock attenuation function tends to be lost completely.

SUMMARY OF THE INVENTION

In order to improve the above, a less preferred embodiment of the present invention has been provided with a line pressure control arrangement which includes a line pressure self-adjusting arrangement for modifying the level of the line pressure in accordance with the difference between the time required to execute a selected shift or shifts and a target value for said shift. However, with this arrangement if a sensor malfunction occurs, the possibility that the line pressure will be adjusted to a level which is either excessive or insufficient is very high.

Accordingly, it is an object of the present invention to provide a system wherein, during the delay between the issuance of shift command signal and the actual initiation of the shift, the outputs of the sensors are monitored and if found to be indicative of post shift conditions, the sensors are deemed to be out of order and steps subsequently are taken to inhibit prime mover torque variation and/or line pressure self adjust so as to avoid the generation of excessive shocks or friction element slippage.

It is a further object of the invention to provide an upper limit to the maximum amount by which the line pressure can be corrected in line pressure control systems including a self adjust function, and thus provide a further technique via which the above mentioned line pressure level related shock and slip problem can be obviated.

More specifically, a first aspect of the present invention comprises a power train including a prime mover and a transmission which is operatively connected therewith, the arrangement featuring: a sensor, the sensor sensing a parameter which varies with operation of one of the prime mover and the transmission; a control unit responsive to the sensor for modifying the operation of one of the prime mover and the transmission during shifting of the transmission in a manner which improves the shift characteristics of the transmission; and a fail-safe unit for preventing the control unit from deteriorating said shift characteristics in the event said sensor malfunction.

A second aspect of the present invention comprises a transmission including friction elements, the transmission being operatively connected with a prime mover, the arrangement comprising: a sensor, the sensor sensing a parameter which varies with transmission operation; a source of line pressure, the line pressure being selectively supplied to the friction elements of the transmission in a manner to induce engagement thereof; line pressure control unit responsive to the sensor for varying the level of line pressure in a manner which tends to induce optimal friction element engagement characteristics; and a fail-safe unit for preventing the level of line pressure from being erroneously adjusted in the event that the sensor malfunctions.

A third aspect of the present invention comprises a power train which features: units for sensing the rotational speeds of the input and output shafts of the transmission, or alternatively, the rotational speed of a prime mover and the transmission output shaft, and using the rotational speed data during shifting in a manner to reduce shift shock; a unit for detecting the delay which occurs between the issuance of a shift command signal and the initiation of the corresponding shift; a sensor; and means for monitoring the output of the sensor during the delay period and for determining the sensor is malfunctioning in the event that the output of the sensor during the delay is indicative of the shift having been completed.

A fourth aspect of the present invention comprises a power train which features: a unit for sensing rotational speeds of the input and output shafts of the transmission, or alternatively, the rotational speed of a prime mover and the transmission output shaft, and using the rotational speed data used during shifting in a manner to determine the shift time defined between shift initiation and the shift termination; line a pressure self adjusting unit for modifying the line pressure level and bringing the shift time to a target time; a unit for determining the delay between the issuance of a shift command and the initiation of the corresponding shift; a unit for monitoring the output of the prime mover rotational speed sensor during the delay period and for determining the sensor to be malfunctioning in the event that the output during the delay is indicative of the prime mover rotational speed having assumed a level which is indicative of the shift having been completed; and a unit for inhibiting the self adjusting function while the prime mover rotational speed sensor is determined to be malfunctioning.

A fifth aspect of the present invention comprises a transmission which features: a unit for sensing the rotational speeds of the input and output shafts thereof, or alternatively, the rotational speed of a prime mover associated with the transmission and the transmission output shaft, and using the rotational speed data used during shifting in a manner to determine the shift time defined between the shift initiation and the shift termination; a unit for modifying the pressure level and bringing the shift time to a target time and a sensor malfunction detection arrangement comprising: a unit for detecting the amount by which the line pressure is self adjusted; and a unit for limiting the maximum amount by which said line pressure can be self adjusted.

A sixth aspect of the present invention comprises a power train which features: means for monitoring the rotational speeds of the input and output shafts of the transmission, or alternatively, the rotational speed of the prime mover and the transmission output shaft, and using the rotational speed data during shifting in a manner to determine the shift time defined between the shift initiation and the shift termination; a prime mover torque output reduction unit for reducing the amount of torque produced by the prime mover during shifts to reduce the amount of shift shock produced during the shift; a unit for detecting the delay which occurs between the issuance of a shift command signal and the initiation of the corresponding shift; a unit for monitoring the output of the sensors during the delay period and for determining a sensor to be malfunctioning in the event that the output thereof during the delay is indicative of the shift having been completed; and a unit for inhibiting torque reduction when a sensor is indicated as malfunctioning.

DETAILED DESCRIPTION OF THE PREFERRED EMBODIMENTS

Figure 5:
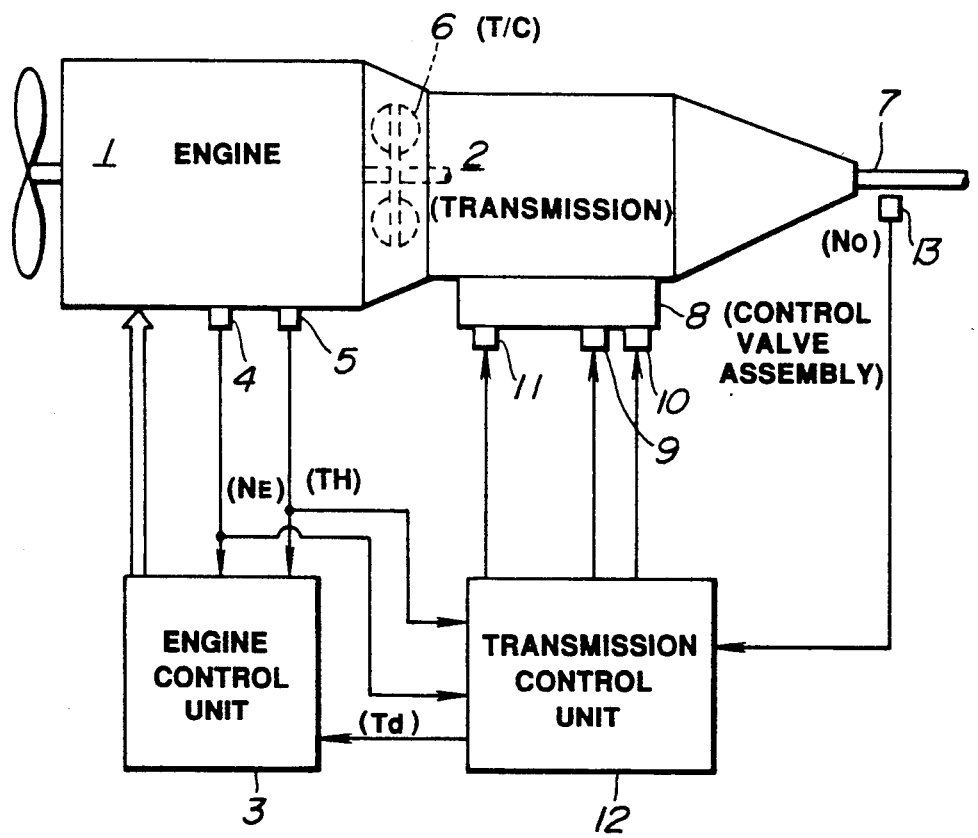
FIG. 5 is a schematic diagram showing an engine system to which the embodiments of the present invention are applicable.

FIG. 5 shows a power train to which an embodiment of the present invention is applied. In this arrangement an electronically fuel injected internal combustion engine 1 is operatively connected by way of a torque converter 6 to a transmission 2.

It should be understood that even though FIG. 5 shows a F-R type power train (front engine-rear wheel drive) the present invention is not limited to the same and can be applied to FF, MR or four-wheel drive 4WD type arrangements if so desired.

The engine control system includes an engine control unit 3 which is supplied inputs from an engine speed sensor 4 and a throttle position sensor 5, Based on the inputs of sensors 4 and 5, the engine control unit 3 which in this instance includes a microprocessor (not show), derives the appropriate injection control pulse width and applies the same to the fuel supply system of the engine.

In this embodiment, the transmission 2 comprises (merely by way of example) a RE4R01A type transmission developed by NISSAN MOTOR CO. LTD., the construction and arrangement of which is described in detail in the Service Manual A261CO7 published by the above mentioned company.

A transmission output shaft 7 provides a drive connection between the differential or final gear (not shown) and the transmission.

The transmission is provided with a transmission control unit 12 which also includes a microprocessor.

This unit 12 is arranged to issue control signals to a control valve assembly 8 which forms part of the transmission. The control valve assembly 10 includes three solenoids 9, 10 and 11.

In this embodiment the transmission includes a gear train comprising a plurality of planetary gear units, and associated hydraulically operated clutches and brakes (not shown). The brakes and clutches are operated by the supply of line pressure which is selectively supplied from the control valve assembly 8.

Depending on the energization of solenoids 9 and 10, the transmission is conditioned to selectively produce a number of different gear ratios by selectively inducing line pressure to be supplied to the appropriate friction elements.

In this instant arrangement four forward gear ratios of the transmission can be produced in the manner indicated in the table below.

TABLE 1

| GEAR: | FIRST | SECOND | THIRD | FOURTH |
| --- | --- | --- | --- | --- |
| SOL. 9: | ON | OFF | OFF | ON |
| SOL. 10: | ON | ON | OFF | OFF |

The third solenoid 11 of the control valve unit 8 is arranged to be operated on a variable duty cycle and to control the level of the line pressure.

The transmission control unit 12 is arranged to receive a data input No from a rotational speed sensor 13. As will be appreciated from the drawings No is indicative of the rotational speed of the transmission output shaft 7. The transmission control unit 12 is further arranged to receive data inputs from the engine speed sensor 4 and the throttle position (engine load) sensor 5.

Based on the data input from the above mentioned sensors the transmission control unit 12 outputs suitable control signals to the the solenoids 9, 10 and 11. This unit further derives and outputs a torque variation control signal Td (in this case a torque reduction or so called "torque down" signal) to the engine control unit 3.

In response to this torque down signal the engine control unit can reduce the amount of fuel supplied to the engine by cutting the supply to selected cylinders for example or by modifying the ignition timing. For further information relating to techniques of implementing the above described torque down control, reference may be had to U.S. Pat. No. 4,266,447 which was issued on May 12, 1981 in the name of Heess et al.

Figure 6:
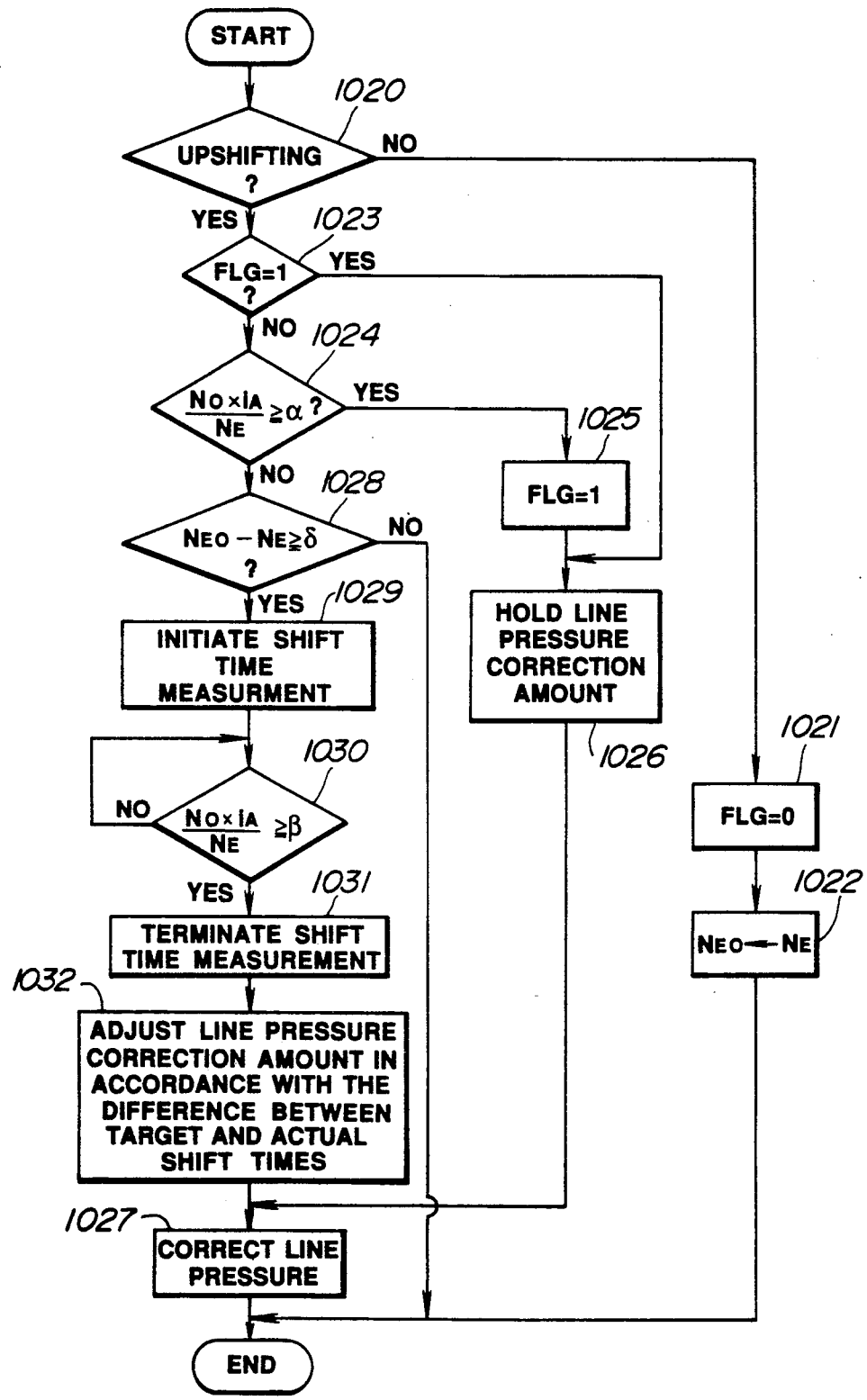
FIG. 6 is a flow chart depicting the steps which characterize a routine which performs self-adjust and self-adjust inhibit functions in accordance with engine speed and transmission output shaft rotational speed input data.

FIG. 6 depicts in flow chart form, a routine which is run in a microprocessor included in the transmission control unit and which performs or inhibits the performance of a line pressure level self-adjust function. In this particular routine the self-update is performed in accordance with the reduction of engine speed during upshifts only.

The reason for this is that it has been found that a reliable correlation between the inertia shift time of an upshift and the level of line pressure can be expected. Hence, by comparing the actual inertia phase time with a time which occurs when the line pressure is at an optimal level, it is possible to use the difference in the times as a parameter by which the line pressure changed. This tends to compensate for wear in the friction elements the changes in the engagement characteristics which tend to occur with change in working fluid temperature and/or the unit to unit deviations which inevitably occur between the friction elements and solenoid valve units.

However, as the self adjust system is totally dependent on the accuracy of the data supplied by the sensor or sensors utilized, this particular embodiment of the present invention includes a step for subjecting the outputs of the same to diagnostic checking. If the sensor or sensors are found to be supplying data indicative of normal malfunction free operation, the routine flows through steps which enable the self-adjust function. However, if the received data is indicative of a sensor malfunction then the self-adjust function is inhibited.

In more detail the first step 1020 of the routine shown in FIG. 6 is such as to determine if the transmission is undergoing an upshift or not. This decision can be made by sampling decisions made by a shift control routine which utilizes vehicle speed and engine load and which compares the instant gear with that which is indicated by the instant speed and load levels in order to determined which shift should be made and via which particular resetting of the shift solenoid settings, the required shift can be put into effect.

For further details concerning the above type of shift control routine and the manner which which such decisions are made, reference can be had to copending U.S. patent application Ser. No. 07/330,129 filed on Mar. 29, 1989 in the name of Narita. The content of this document is hereby incorporated by reference thereto.

In the event that the transmission is not undergoing an upshift, the routine flows to step 1021 wherein a sensor malfunction flag is cleared (viz., FLG=0) and at step 1022 the instant engine speed is read and stored in memory as the current NEO value. This value is used in connection with the sensor malfunction determination as will become more apparent hereinafter.

On the other hand, if the transmission is found to be undergoing an upshift, then at step 1023 the status of the sensor malfunction flag FLG is checked. If it is found that FLG=0 then at step 1024 then the rotational speed of the transmission output shaft No is read and multiplied by a factor iA indicative of the gear ratio which will be produced by the transmission after the instant shift is completed. The product produced by this multiplication is then divided by the the instant engine speed Ne and compared with a predetermined value œ. If the No×iA/Ne≧ œ then it is deemed that the inputted data is such as to indicate that a sensor malfunction has occurred and the routine flows across to step 1025 wherein FLG=1. Viz., the data is indicative of at least one of the engine speed sensor 4 and the transmission output shaft rotational speed sensor 13 is not functioning properly.

Following this, the routine flows to step 1026 wherein the self adjust function is inhibited and the current line pressure correction amount or value is temporarily frozen as used in step 1027 to adjust the duty cycle of the signal which is applied to the line pressure control solenoid 11.

If at step 1024 as sensor malfunction is not indicated, then the routine flows to step 1028 wherein the rate at which the engine speed is changing is determined. As shown, this is done by comparing the difference between the instant engine speed and the value recorded in step 1022 with a predetermined value à. If the rate at which the engine speed is changing does not exceed a then routines ends. On the other hand, if a is reached and/or exceeded then it is assumed that the shift has actually begun and the routine flows to step 1029 wherein the a shift timer (soft clock) is set counting and begin timing of the shift inertia phase.

At step 1030 the result derived from No×iA/Ne is compared with a predetermined value β until such time it becomes equal to or exceeds the same. At this time it is assumed that the shift has been completed. Accordingly, at step 1031 the count of the shift timer is recorded the counter is cleared to be ready for the next run. At step 1032 the count which has just been recorded is compared with a target value for the instant upshift and the difference noted. Note should be made that the shift time indicated by the count is the so called inertia phase time of the shift.

Based on the difference a correction amount which is designed to vary the duty cycle which is applied to the line pressure control solenoid in a direction which will reduce the difference to zero is calculated. As the shift time approaches the target time, the level of line pressure assumes a value at which shift shock or friction element slippage is reduced.

However, due to the diagnosis of the sensor outputs at step 1024 in the event that a sensor malfunction is indicated, the sensor malfunction flag is set and the routine is guided away from steps 1028 to 1032 and the self-adjust function is inhibited and the generation of what is apt to be a vastly erroneous level of line pressure is prevented. Under these conditions the routine flows through step 1026 and the correction value which was set while the sensors were indicated as operating properly is used. This of course induces the line pressure to become constant at the level determined while the sensors were both operating properly.

It is of course within the scope of the instant invention to utilize the transmission input shaft rotational speed (viz., the rotational speed of the torque converter output shaft) in place of engine speed if so desired.

Figure 7:
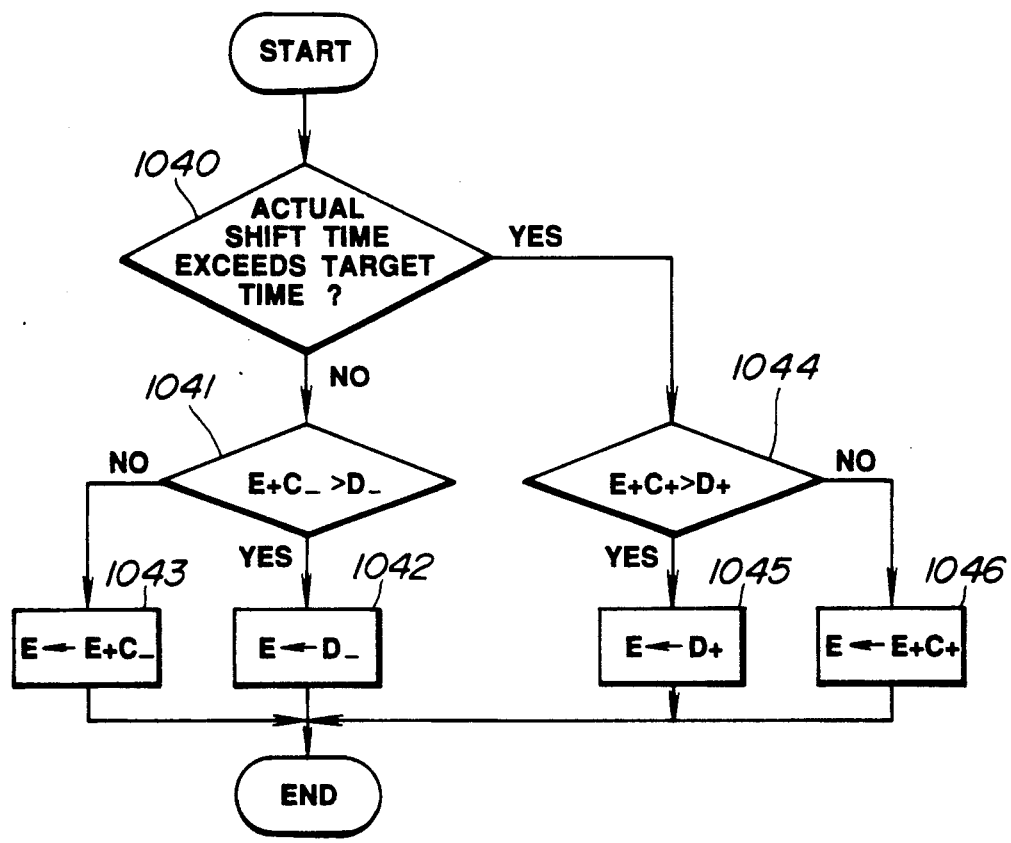
FIG. 7 is a flow chart which shows the steps performed by a sub-routine which is involved in the self-adjust process of the routine shown in FIG. 6.

FIG. 7 shows a flow chart which depicts the steps which characterize an embodiment of the present invention in which the maximum amount by which the line pressure can be adjusted under the control of a self adjust arrangement is limited. With this arrangement even if one of the sensors becomes inoperative or produces erroneous data, the maximum amount by which the pressure level can be increased or decreased is limited. Therefore, even in the worst case the control is limited to a degree which maintains the amount of shift shock or friction element slip within reasonable limits. This embodiment obviates the need to provide a step or steps which diagnose the operability of the sensors.

In more detail, in the first step of this routine the count of the shift timer such as recorded in step 1031 of the routine shown in FIG. 6, is compared with a target value which is deemed to be optimal for the instant upshift. Of course this value can be varied depending on which upshift is being implemented. These values can be stored in ROM and the appropriate one read out into RAM in response to step 1020. In the event that the shift timer count is less than that of the target time indicating that the level of line pressure is on the high side of optimal, the routine flows to step 1041 wherein it is determined if the sum of the line pressure correction amount determined on the previous run E and a value C− (a line pressure decrement adjustment factor), is greater than a value D−. In this instance D− denotes a predetermined maximum amount by which the line pressure can be reduced.

In the event that E+C− is found be greater than D− then the routine flows to step 1042 wherein the value of E is modified in a manner to become equal to D—. This of course sets the line pressure level at its minimum possible level. However, if the E+C— is not greater than D— then at step E is modified to assume the value E+C—.

On the other hand, if the the actual shift time is not less than the target value, then the routine flows to step 1044 wherein E+C+ is compared with a value D+. In this instance C+ denotes a line pressure increment adjustment factor and D+ represents the maximum increment in line pressure that is permitted on any one run. As shown, depending on the magnitude of E+C+, either the total of E and C+ or D+ is used depending on which is the smaller.

Figure 8:
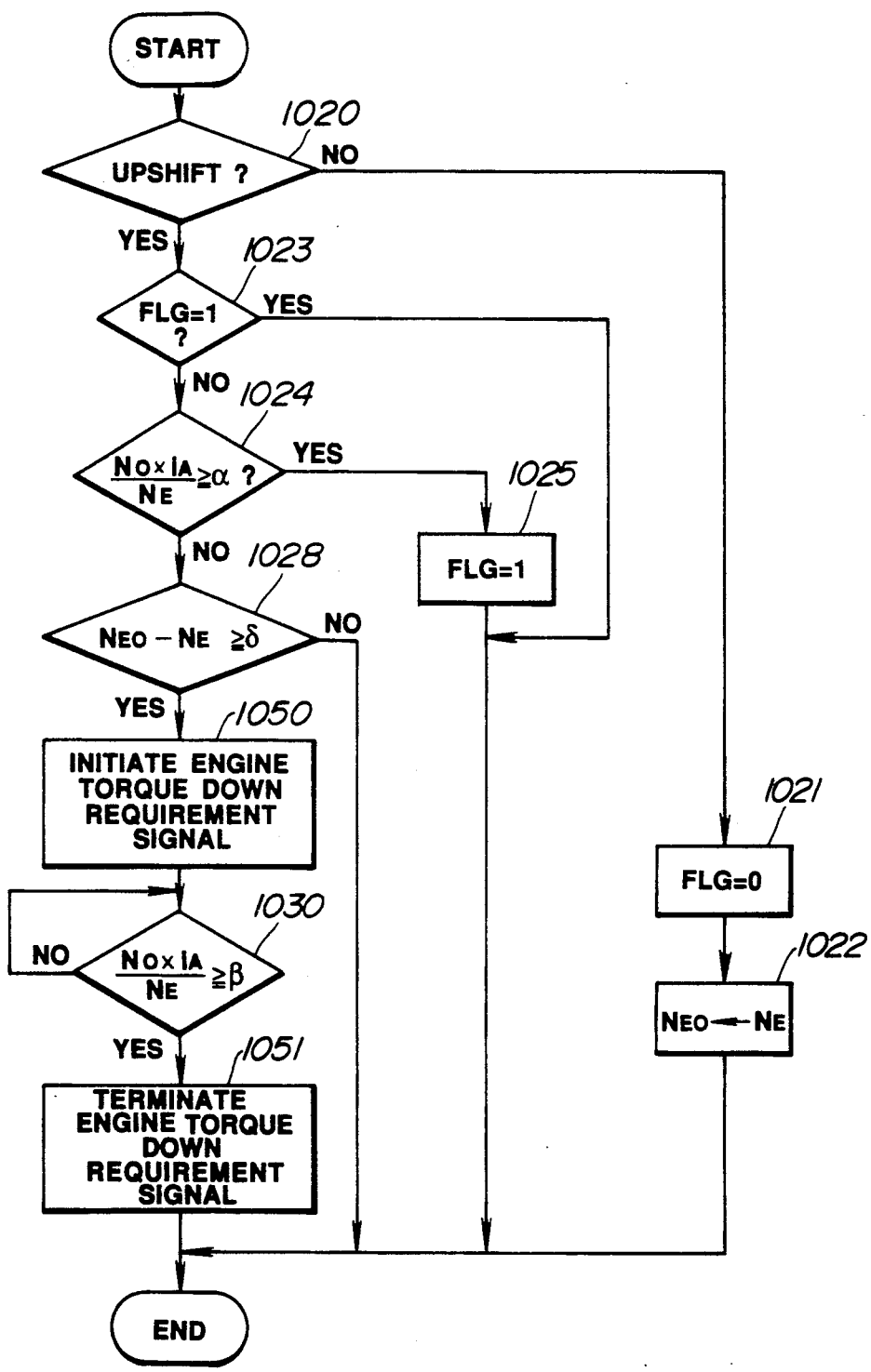
FIG. 8 is a flow chart which depicts the steps which characterize a routine via which shift shock attenuating engine torque variation control is implemented in accordance with engine speed and transmission output shaft rotational speed input data.

FIG. 8 shows a flow chart which depicts the operations of an embodiment which features the issuance of a torque reduction signal. The steps in this routine which are the same as those of the flow chart shown in FIG. 6 are labeled with the same numerals. This routine therefore differs from the previously described one in that at step 1050 in place of timing the shift time, the torque down signal is issued to the engine control unit 3 until such time as $No \times iA /Ne \geq \beta$ whereat it can be assumed that the shift has completed. At step 1051 the issuance of the torque reduction signal is terminated and thus stops the temporary "torque down" operation of the engine (prime mover).

As will be appreciated, the outputs of the sensors 3 and 14 are subject to diagnostic examination in step 1024 and thus the erroneous issuance of a torque down signal in the event of a sensor malfunction is prevented.

As mentioned above, the reduction in the amount of torque produced by the engine can be achieved by a fuel reduction, a fuel cut-off to all or a number of cylinders or a change in ignition timing, or a combination of one or more of these measures.

The present invention is not limited to the above described embodiments and is deemed to be such as to include a variety of concepts. For example it is within the scope of the present invention to monitor the operation of the sensor or sensors during the period defined between the issuance of command to implement a shift and the actual initiation of the demanded shift. By way of example, if the engine speed sensor output is sampled during the delay and found to exhibit data indicative of the state which occurs after the shift is completed, it can be deemed to be malfunctioning.

A second possibility with the present invention is that, if the transmission includes a self adjust function, this function can be inhibited in the presence of a sensor malfunction to avoid the line pressure being shifted under the control of erroneous input data to the degree that shift shock or friction element slippage is accentuated rather than being attenuated.

A third possibility comes in stopping the issuance of signal to the engine control which induces a temporary reduction (torque down) of the torque output of the engine during shifts in the event that sensor malfunction is diagnosed.

Of course combinations of the above are also possible, and malfunction diagnosis can be extended to as many sensors as are involved in supplying data to the transmission control arrangement. Specific examples of variations possible are shown in FIGS. 1 to 4.

Figure 1:
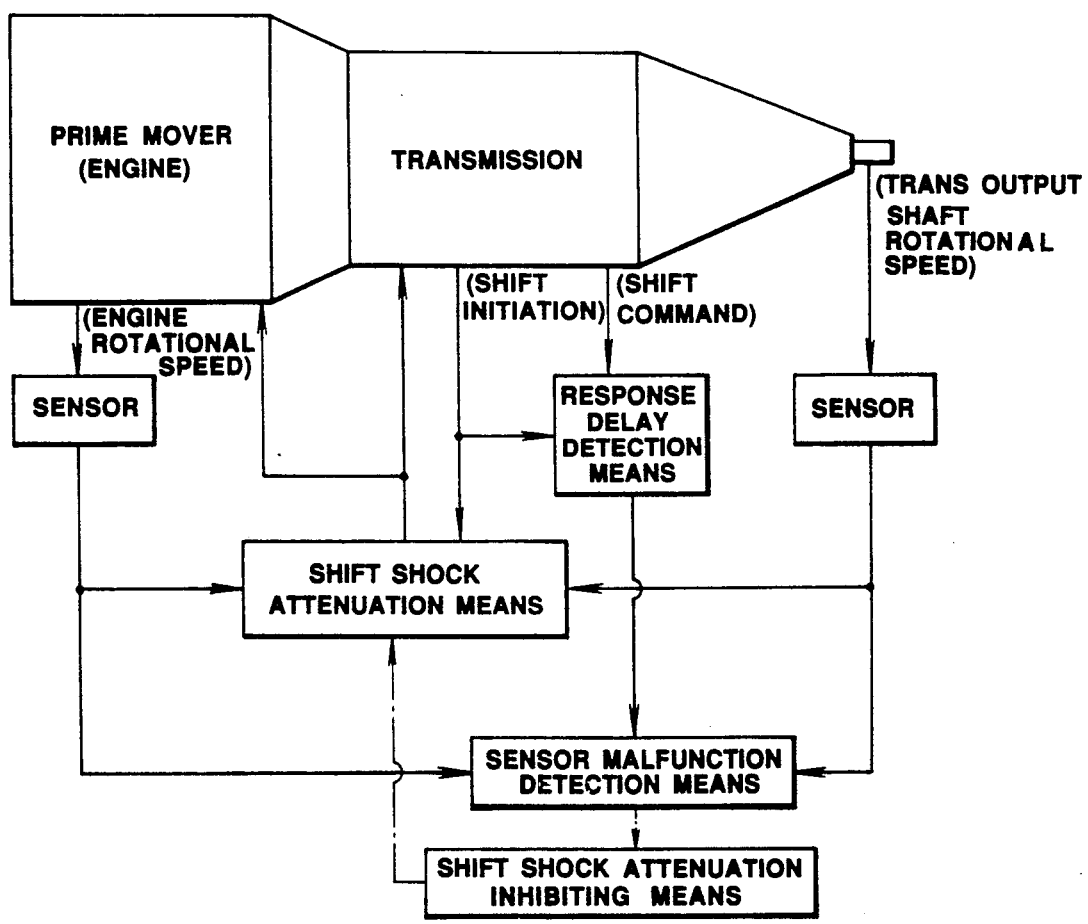
FIGS. 1 to 4 are block diagrams which illustrate the various conceptual arrangements which are included in the present invention.

In FIG. 1 the outputs of the sensors are checked during the delay between the issuance of the shift command signal and the actual shift initiation. While the sensors are both operative shift shock attenuation control is applied to both the engine and the transmission. Viz., in this case torque down and line pressure self adjustment are both carried out. In the case of a sensor malfunction, both controls can be inhibited (by way of the connection shown in phantom) and/or indication alone made that a sensor malfunction has occurred and repairs should be made.

Figure 2:
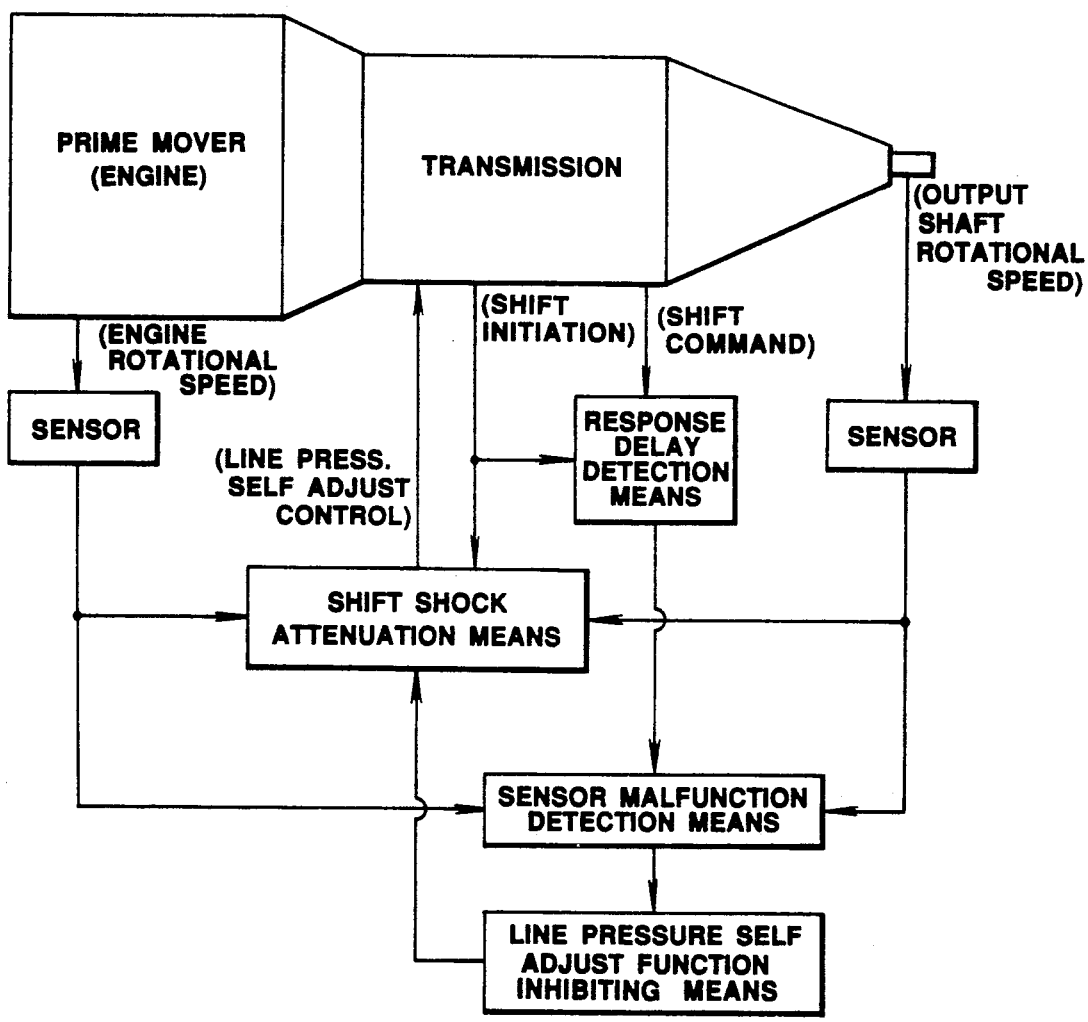
Figure 3:
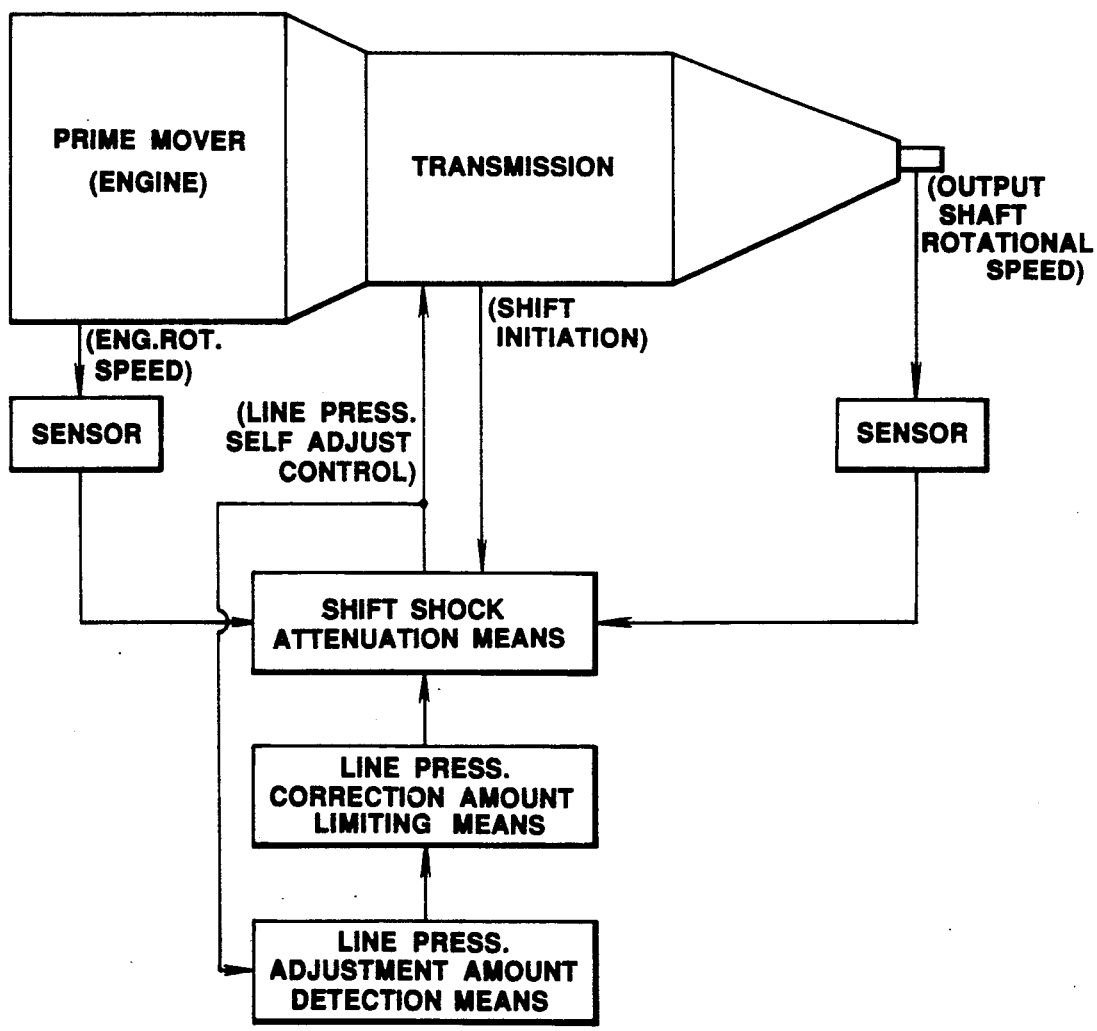

In the arrangement shown in FIG. 2 the control of the engine torque is omitted and the line pressure self adjust function inhibited in the case a sensor becomes inoperative or otherwise malfunctions. In the arrangement shown in FIG. 3, the line pressure adjustment amount is monitored and if a maximum or minimum level is reached, this limit is applied to prevent excessive deviation.

Figure 4:
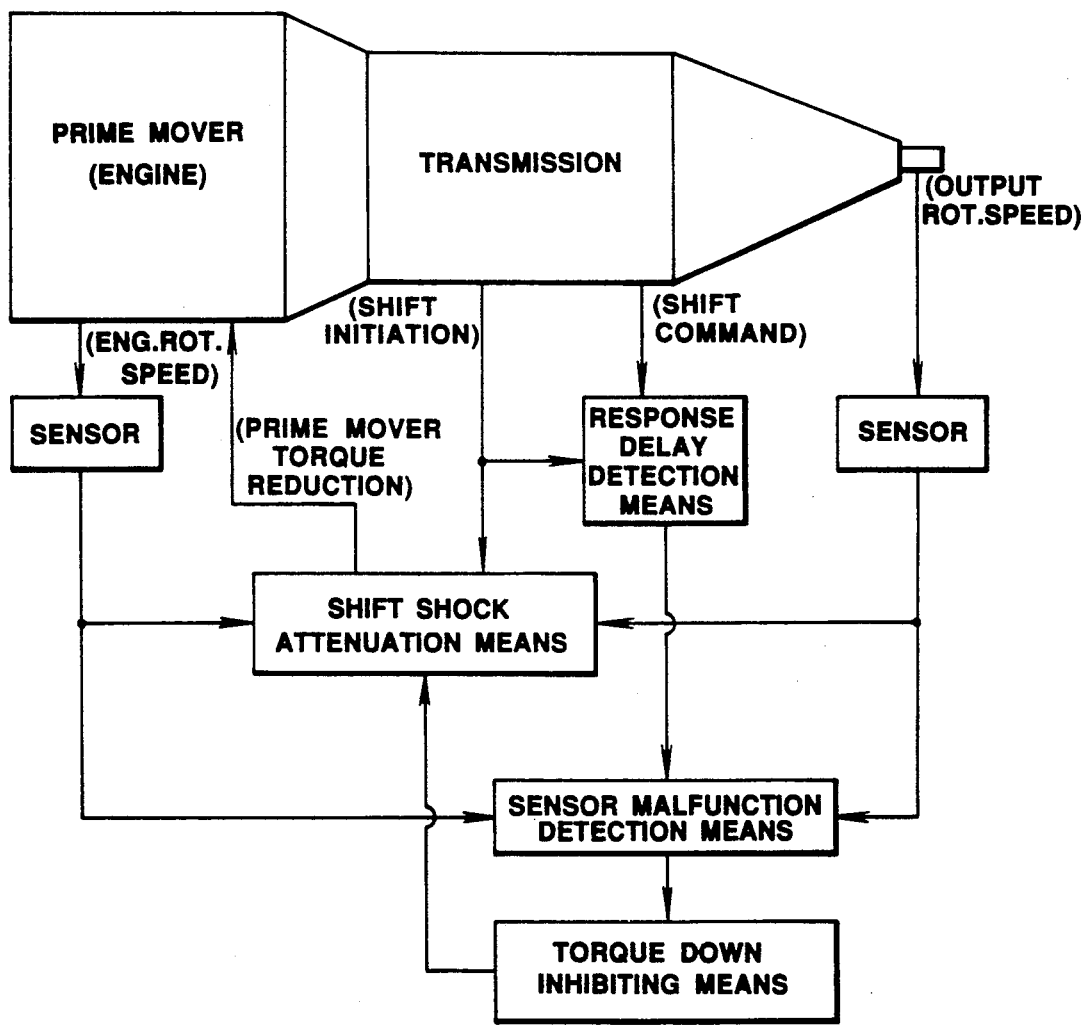

In the arrangement shown in FIG. 4 only engine torque control is implemented and the level of line pressure is not adjusted in response to sensor malfunction.

The various other modification which are possible without deviating from the scope of the present invention are deemed within the perview of those skilled in the art to which the instant invention pertains and as such no further disclosure is deemed necessary.

What is claimed is:

1. In a power train including an engine and a transmission operatively connected to said engine, the arrangement comprising:

sensing means, including a sensor, for sensing first and second rotational speeds, said first and second rotational speeds being indicative of respective rotational speeds of an input shaft and an output shaft of said transmission, and for using rotational speed data obtained during shifting to reduce shift shock; and means for monitoring an output of said sensor between an issuance of a shift command signal and an initiation of a corresponding shift and for determining said sensor to be malfunctioning in the event that said output of said sensor between said issuance of said shift command signal and said initiation of said corresponding shift is indicative of a shift having been completed.

2. In a power train which includes an engine and a transmission connected to said engine, the arrangement comprising:

means, including an engine speed sensor, for sensing first and second rotational speeds, said first and second rotational speeds being indicative of respective rotational speeds of input and output shafts of said transmission, and for using rotational speed data during shifting to determine a shift time defined between a shift initiation and a shift termination;

line pressure self adjusting means for modifying a line pressure level and bringing said shift time to a target time;

means for monitoring an output of said engine speed sensor between an issuance of a shift command and an initiation of a corresponding shift and for determining said sensor to be malfunctioning in the event that said output is indicative of engine speed having assumed a level which is indicative of a shift having been completed; and means for inhibiting said self adjusting means from modifying said line pressure level which said engine speed sensor is determined to be malfunctioning by said means for monitoring.

3. In a transmission the arrangement comprising:

means for sensing respective rotational speed of an input shaft and an output shaft of said transmission and for using rotational speed data during shifting to determine a shift time defined between a shift initiation and a shift termination;

means for modifying a level of line pressure and bringing said shift time to a target time; and a sensor malfunction detection arrangement including means for detecting an amount by which said line pressure is self-adjusted and means for limiting a maximum level to which said line pressure is self-adjusted.

4. In a power train including a prime mover and a transmission which is inoperatively connected with said prime mover, the arrangement comprising:

means for monitoring respective rotational speeds of transmission input and output shafts and using rotational speed data during shifting to determine a shift time defined between a shift initiation and a shift termination;

prime mover torque output reduction means for reducing an amount of torque produced by said prime mover during a shift to reduce shift shock produced during said shift;

means for monitoring an output of a sensor between an issuance of a shift command signal and an initiation of a corresponding shift and for determining said sensor to be malfunctioning in the event that said output is indicative of a shift having been completed; and means for inhibiting torque reduction when said sensor is indicated as malfunctioning.

* * * * *